US008765254B2

(12) United States Patent
Chernokalskaya et al.

(10) Patent No.: US 8,765,254 B2
(45) Date of Patent: Jul. 1, 2014

(54) POLYMERIC MEMBRANES WITH HUMAN SKIN-LIKE PERMEABILITY PROPERTIES AND USES THEREOF

(75) Inventors: Elena Chernokalskaya, Lexington, MA (US); Vivek Joshi, Chelmsford, MA (US); Mark Kavonian, North Reading, MA (US); Dave Brewster, Beverly, MA (US)

(73) Assignee: EMD Millipore Corporation, Billerica, MA (US)

( * ) Notice: Subject to any disclaimer, the term of this patent is extended or adjusted under 35 U.S.C. 154(b) by 624 days.

(21) Appl. No.: 13/079,511

(22) Filed: Apr. 4, 2011

(65) Prior Publication Data
US 2011/0281771 A1  Nov. 17, 2011

Related U.S. Application Data

(60) Provisional application No. 61/341,855, filed on Apr. 5, 2010, provisional application No. 61/408,864, filed on Nov. 1, 2010.

(51) Int. Cl.
*B32B 3/26* (2006.01)

(52) U.S. Cl.
USPC ............... 428/308.4; 428/306.6; 428/447; 428/451

(58) Field of Classification Search
USPC ................ 428/306.6, 308.4, 447, 451
See application file for complete search history.

(56) References Cited

U.S. PATENT DOCUMENTS 5,536,656 A   7/1996   Kemp et al.

OTHER PUBLICATIONS

International Preliminary Report on Patentability received for PCT Patent Application No. PCT/US2011/031094, mailed on Oct. 18, 2012, 9 pages.
Akomeah et al., "Effect of abrasion induced by a rotating brush on the skin permeation of solutes with varying physicochemical properties", European Journal of Pharmaceutics and Biopharmaceutics, vol. 68, No. 3, Mar. 2008, pp. 724-734.
Dias et al., "Topical delivery of caffeine from some commercial formulations", International Journal of Pharmaceutics, vol. 182, No. 1, May 10, 1999, pp. 41-47.
Dureja et al., "Simulation of skin permeability in chitosan membranes", International Journal of Pharmaceutics, vol. 213, No. 1-2, Feb. 1, 2001, pp. 193-198.
Frum et al., "Evidence that drug flux across synthetic membranes is described by normally distributed permeability coefficients", European Journal of Pharmaceutics and Biopharmaceutics, vol. 67, No. 2, Sep. 2007, pp. 434-439.
Leveque et al., "Comparison of Franz cells and microdialysis for assessing salicylic acid penetration through human skin", International Journal of Pharmaceutics, vol. 269, No. 2, Jan. 28, 2004, pp. 323-328.
Leveque et al., "Use of a molecular form technique for the penetration of supersaturated solutions of salicylic acid across silicone membranes and human skin in vitro", International Journal of Pharmaceutics, vol. 318, No. 1-2, Aug. 2, 2006, pp. 49-54.

(Continued)

*Primary Examiner* — D. S. Nakarani
(74) *Attorney, Agent, or Firm* — EMD Millipore Corporation

(57) ABSTRACT

The present invention provides synthetic membranes which are suitable as a human skin substitute for the investigation of transdermal diffusion of candidate pharmaceutical and cosmetic compounds. The membranes according to the present invention exhibit human skin-like permeability properties with respect to the diffusion of a wide range of compounds having widely different physico-chemical properties.

14 Claims, 17 Drawing Sheets

(56) References Cited

OTHER PUBLICATIONS

Loftsson et al., "Development and evaluation of an artificial membrane for determination of drug availability", International Journal of Pharmaceutics, vol. 326, No. 1-2, Dec. 1, 2006, pp. 60-68.

Lopez et al., "The use of colloidal microgels as a (trans)dermal drug delivery system", International Journal of Pharmaceutics, vol. 292, No. 1-2, Mar. 23, 2005, pp. 137-147.

Mura et al., "Development, characterization and in vivo evaluation of benzocaine-loaded liposomes", European Journal of Pharmaceutics and Biopharmaceutics, vol. 67, No. 1, Aug. 2007, pp. 86-95.

Nicoli et al., "Association of nicotinamide with parabens: Effect on solubility, partition and transdermal permeation", European Journal of Pharmaceutics and Biopharmaceutics, vol. 69, No. 2, Jun. 2008, pp. 613-621.

Ogiso et al., "Drug Penetration through Living Skin Equivalent, Rat and Human Skin and Effect of Enhancers on Penetration", J. Pharm. Sci. Tech., Japan, vol. 58, No. 3, 1998, pp. 155-163.

Ottaviani et al., "In Silico and In Vitro Filters for the Fast Estimation of Skin Permeation and Distribution of New Chemical Entities", Journal of Medicinal Chemistry, Vol. 50, No. 4, 2007, pp. 742-748.

Ottaviani et al., "Parallel Artificial Membrane Permeability Assay: A New Membrane for the Fast Prediction of Passive Human Skin Permeability", Journal of Medical Chemistry, vol. 49, No. 13, 2006, pp. 3948-3954.

Schmook et al., "Comparison of human skin or epidermis models with human and animal skin in in-vitro percutaneous absorption", International Journal of Pharmaceutics, Vol. 215, No. 1-2, Mar. 14, 2001, pp. 51-56.

Wang et al., "In vitro permeation of repellent DEET and sunscreen oxybenzone across three artificial membranes", International Journal of Pharmaceutics, vol. 310, No. 1-2, Mar. 9, 2006, pp. 110-117.

"Multiwell Solutions for Discovery Research and Sample Prep", Multiwell Product Guide, © 2008 Millipore Corporation, 44 pages.

International Search Report received for PCT Patent Application No. PCT/US2011/031094, mailed on Jun. 29, 2011, 5 pages.

This system is similar to a Frane Cell,
    A few key advantages:
Disposable
Multi-well possibility
Minimize the pressure diff across transdermal matrix
Control dif temps of solutions
Non disruptive buffer solution access
Fluid volume relationship unchanged during buffer sampling

POLYMERIC MEMBRANES WITH HUMAN SKIN-LIKE PERMEABILITY PROPERTIES AND USES THEREOF

RELATED APPLICATIONS

The present U.S. patent application claims the benefit of priority of U.S. provisional patent application No. 61/341,855, filed on Apr. 5, 2010, and U.S. provisional patent application No. 61/408,864, filed on Nov. 1, 2010, the entire content of each of which is incorporated by reference herein in its entirety.

FIELD OF THE INVENTION

The present invention relates to novel polymeric membranes with human skin like permeability properties and methods of making and using the same.

BACKGROUND

Candidate pharmaceutical and cosmetic compounds and formulations are generally tested for diffusion across skin. Most preferably, excised human cadaver skin or human skin left over from cosmetic surgery is used for such testing, typically in an in-vitro experimental set up. Although not ideal, excised animal skin is also sometimes used for investigating transdermal diffusion of various compounds and formulations, e.g., skin from rat, mouse or pig. However, results obtained with excised animal skin and animal models cannot always be extrapolated to human skin. Further, obtaining enough supply of excised human and animal skin is often a challenge and tends to be costly.

Furthermore, there are bioengineered skin equivalents such as Grallskin™ LSE which are also available for the transdermal diffusion testing of candidate formulations and compounds. However, such equivalents are often costly and have been shown to not be suitable for the testing of all compounds, as they often show a much higher diffusion rate for various compounds than human skin. See, Schmook et al., Int J. Pharm. 215:51-56 (2001).

Lastly, in addition to excised human and animal skin and bioengineered skin equivalents, there have been attempts to create synthetic membranes which may be used as human skin models to investigate transdermal diffusion properties of pharmaceutical and cosmetic compounds and formulations. These include membranes such as low-density polyethylene (LDPE) membrane, cellulose acetate membrane, silicone membrane, hydrophobic polyvinylidene fluoride (PVDF) membrane, polycarbonate membrane, chitosan membrane, composite cellophane membrane, poly (dimethylsiloxane) membrane and cellulose nitrate membrane, with various modifications. See, e.g., Wang et al., Int. J. Pharm., 310:110-117 (2006); Dias et al., Int. J. Pharm., 182:41-47 (1999); Leveque et al. Int. J. Pharm., 318:49-54 (2006); Ottaviani et al., J. Med. Chem., 49: 3948-3954 (2006); Ottaviani et al., J. Med. Chem., 50:742-748 (2007); Leveque et al., Int. J. Pharm., 269: 323-328 (2004); Dureja et al., ltd. Pharm., 213: 193-198 (2001); Loftsson et al., Int. J. Pharm., 326:60-68 (2006); Frum et al., Eur. J. Pharm. Biopharm., 67: 434-439 (2007); and Mura et al., Eur. J. Pharm. Biopharm., 67:86-95 (2007).

However, none of the existing synthetic membranes provide a suitable skin substitute for investigating transdermal diffusion properties of a wide range of pharmaceutical and cosmetic compounds and formulations because of low reproducibility and/or high variability compared to human skin.

SUMMARY OF THE INVENTION

The present invention is based, at least in part, on the observation that an ultrafiltration membrane, when treated a certain way, exhibits human skin-like permeability properties and, accordingly, provides a suitable skin substitute for investigating the transdermal diffusion properties of a wide array of pharmaceutical and cosmetic compounds and formulations.

The synthetic membranes according to the present invention are superior as a human skin substitute over prior art synthetic membranes, in that they exhibit a high degree of correlation with human skin with respect to transdermal diffusion of a wide variety of compounds with diverse physico-chemical properties. In other words, while several of the prior art synthetic membranes appear to exhibit permeability properties similar to human skin for a limited number of compounds in certain instances or for compounds having similar physico-chemical properties, they do not appear to be reliable as human skin substitutes for investigating transdermal diffusion of compounds which may widely differ in their physico-chemical properties.

The synthetic membranes according to the present invention exhibit permeability properties similar to human skin for a wide variety of compounds which widely differ in their physico-chemical properties, thereby making them a desirable human skin substitute for investigating transdermal diffusion of a wide variety of pharmaceutical and cosmetic compounds and formulations.

In one aspect of the present invention, a modified ultrafiltration membrane is provided, wherein the modification comprises treatment of an ultrafiltration membrane with a mixture of a fatty acid ester (e.g., isopropyl myristate) and a polydimethylsiloxane (e.g., silicone oil), wherein the modified ultrafiltration membrane comprises human skin-like permeability properties.

In a particular embodiment, the ultrafiltration membrane is a polyethersulfone (PES) membrane.

In various embodiments, the human skin-like permeability properties of the modified ultrafiltration membrane according to the present invention comprise a high degree of correlation with human skin with respect to the diffusion of one or more compounds across the membrane.

In another aspect according to the present invention, a method of making a synthetic membrane which comprises human skin-like permeability properties is provided, wherein the method comprises the steps of: (a) providing a polyethersulfone ultra filtration membrane; and (b) coating the membrane with a mixture of isopropyl myristate and silicon oil, thereby resulting in a synthetic membrane which comprises human skin-like permeability properties.

In some embodiments of the present invention, a synthetic membrane described herein is sealed into a multiwell plate, which can be used, e.g., for high-throughput analysis of compounds.

Also encompassed by the present invention are devices containing a synthetic membrane according to the present invention. In a particular embodiment, such a device is a multiwell plate used for high throughput screening.

In order that the present disclosure may be more readily understood, certain terms are first defined. Additional definitions are set forth throughout the detailed description.

I. DEFINITIONS

The term "ultrafiltration membrane" or "UF membrane," as used interchangeably herein, generally refers to a polymeric membrane having a pore size of 0.1 μm or smaller than 0.1 μm, typically ranging from 10 nm to about 100 nm. UF membranes are also defined by the molecular weight of the analyte that they are able to retain. A representative UF membrane which is modified as described herein, is a polyethersulfone (PES) OF membrane, e.g., Biomax® 5 PBCC (Millipore Corporation).

The term "modified," "modify" or "modification," as used herein, refers to the treatment of a membrane, e.g., a UF membrane such as the Biomax® 5 PBCC membrane (Millipore Corporation), which results in the membrane having human skin-like permeability properties, as measured using one or more assays described herein and/or those known in the art. In various embodiments, the modification comprises treatment of a PES UF membrane such as the Biomax® 5 PBCC membrane (Millipore Corporation) with a mixture of a fatty acid-ester (e.g., isopropyl myristate) and a polydimethylsiloxane (e.g., silicone oil).

The term "human skin-like permeability properties," as used herein, refers to the rate of permeation or diffusion of a compound through the modified UF membrane, as described herein, which has a high degree of correlation with the rite of permeation of the same compound through human skin.

Human skin is typically made up of three major layers: (a) stratum corneum (10-15 μm in thickness); (b) epidermis (~100 μm in thickness); and (c) dermis (2000-3000 μm in thickness). Morphology of human skin, as seen using scanning electron microscopy (SEM), is shown in FIG. 1.

A large number of lipids (e.g., ceramides, cholesterol and fatty acids) are present in the skin which influence transport characteristics of human skin. A number of studies have reported that the stratum corneum is the layer of skin which offers the most resistance to the diffusion of compounds across the skin; however, once a compound goes across the stratum corneum layer, it is easy for the compound to diffuse through the other layers, as they appear to offer less resistance.

Representative OF membranes have a pore size of about 30 nm to 0.45 μm and a thickness ranging from 100-350 μm. Morphology of some of the representative membranes as seen using SEM is shown in FIGS. 2, 3 and 4. FIG. 2 is a representative SEM image of the membrane Viresolve® V70; FIG. 3 is a representative SEM image of the PLCCC 5000 MWCO UF composite regenerated cellulose membrane on UPE support; and FIG. 4 is a representative SEM image of the Biomax® 5 PBCC OF membrane.

The Biomax® 5 PBCC membrane appears to be most similar in morphology to human skin, at least as observed by SEM. The top layer of the membrane, as seen in the SEM image, is a thin "skin-like" layer which is followed by a more porous and open structure and the bottom layer consists of even more porous and open, non-woven polypropylene base. The treatment of this membrane with isopropyl myristate and silicone oil further mimics the lipids that are present in the skin.

The term "physico-chemical properties," as used herein, refers to various physical and/or chemical properties of compounds, such as, for example, molecular weight, polarity, hydrophobicity, partition coefficient value, distribution coefficient value and dissociation constant of compounds. The modified UF membranes of the present invention provide a desirable substitute for human skin, in that show a high degree of correlation with human skin for the diffusion of a wide variety of compounds having diverse physico-chemical properties, relative to prior art synthetic membranes. Accordingly, the modified UF membranes according to the present invention can be used for investigating diffusion of a wide array of pharmaceutical and cosmetic compounds and formulations across human skin, ranging from highly polar compounds to non-polar compounds, for example, as demonstrated by the Examples set forth herein.

The term "partition coefficient value" or "log P," as used herein, refers to the ratio of concentrations of un-ionized compound between the two solvent phases, e.g., water and n-octanol. The partition coefficient provides a measure of polarity of a compound. In order to measure the partition coefficient of ionizable solutes, pH of the aqueous phase is adjusted such that the predominant form of the compound is un-ionized. The logarithm of the ratio of the concentrations of the un-ionized solute in the solvents is referred to as the log P value. In general, higher the log P value of a compound, more non-polar the compound is and smaller the log P value of the compound, more polar the compound is. The membranes described herein can be used for investigating transdermal diffusion of a wide variety of compounds having varying log P values, as exemplified by Table 1 below.

The term "distribution coefficient value" or "log D," as used interchangeably herein, refers to the ratio of the sum of the concentrations of all forms of the compound (ionized plus un-ionized) in each of the two solvent phases, e.g., water and n-octanol. Log D is another measure of polarity of a compound; however, it is different from log P in that it also takes into account the effect of pH of the aqueous solution. For example, for the measurement of distribution coefficient, the pH of the aqueous phase is buffered to a specific value such that the pH is not significantly perturbed by the introduction of the compound. The logarithm of the ratio of the sum of concentrations of the various forms of the solute in one solvent to the sum of the concentrations of its forms in the other solvent is referred to as the log D value. The membranes described herein can be used for investigating transdermal diffusion of a wide variety of compounds having varying log D values, as exemplified by Table 1 below.

The term "dissociation constant," "acid constant," "ionization constant," or "pKa value," as used interchangeably herein, refers to the value used to describe the tendency of compounds or ions to dissociate.

In some embodiments, a synthetic membrane described herein is sealed into a multiwell plate having a plurality of wells, for example, for high throughput screening of compounds. Without wishing to be bound by theory, it is contemplated that a multiwell screening plate can have any number of wells, e.g., 4, 6, 8, 14, 24, 48, 96, 384 etc. In a particular embodiment, a synthetic membrane according to the present invention is sealed into a multiwell plate containing a plurality of wells and the plate is subsequently immersed into a receiver plate containing a corresponding number of wells.

The membrane may be attached to the multiwell screening plate using a variety of methods including, but not limited to, heat sealing, ultrasonic welding, adhesive bonding and compression sealing.

The use of synthetic membranes described herein in a multiwell plate format presents a huge advantage over human and animal skin models, as it is usually not possible to put human and animal skin in a multi well plate format. Accordingly, the membranes according to the present invention provide a novel tool for high throughput screening of compounds and formulations, which is typically not possible with human and animal skin models. Hence, while human and animal skin models are limited to screening of compounds in a serial mode, the synthetic membranes according to the present invention enable screening of compounds in a high throughput mode.

Table 1 below provides a list of exemplary compounds, the transdermal diffusion properties of which were investigated using the membranes described herein. Notably, several of these compounds are found in cosmetics or insecticides/pesticides formulations, and widely differ in one or more of their physico-chemical properties. Notably, majority of these compounds were shown to have similar diffusion using the claimed membrane to human skin.

TABLE 1

| Compound Class | Compound Name | Mol Wt. | Log P | Aqueous Solubility, LogS | pKa | Log D (pH 7.4) |
|---|---|---|---|---|---|---|
| Xanthine derivative | Caffeine | 194.2 | −0.131 | −1.25 | 0.63 | −0.13 |
| Alkaloid | Nicotine | 162.23 | 0.72 | −0.24 | 8 | 0.02 |
| Pyrimidine diamine der. | Trimethoprim | 290.3 | 0.791 | −2.67 | 7.2 | 0.58 |
| Alkaloid | Scopolamine (Salt Form) | 303.1 | 0.8 | −1.66 | 7.55 | |
| Carboxylic acid | Acetyl Salicylic Acid (Aspirin) | 180.2 | 1.19 | −2.09 | 3.48 | −1.89 |
| Corticosteroid | Hydrocortisone | 362.4 | 1.462 | | 12.48 | 1.42 |
| Glucocorticoid | Dexamethasone | 392.5 | 1.869 | −3.89 | 12.14 | 1.87 |
| Carboxylic acid | Benzoic Acid | 122.12 | 1.96 | | 4.2 | −0.4 |
| Hydroxybenzoate Esters | Methyl paraben | 152.14 | 1.96 | | | |
| Heterocyclic Acetic Acid Der. | Ketorolac | 255.2 | 2.1 | −2.7 | 3.5 | |
| Dimethylphenyl acetamide derivative | Lidocaine | 234.3 | 2.3 | −2.6 | 8.53 | 1.2 |
| Aminobenzoate derivative | Tetracaine | 264.4 | 3.649 | −2.75 | 8.24 | 2.75 |
| Phenyl alkylamine | Verapamil | 454.6 | 3.899 | | 8.97 | 2.33 |
| Carboxylic acid | Diclofenac | 318.13 | 4.05 | | 4.18 | 0.95 |
| Phenyl alkanoic acid Derivative | Flurbiprofen | 244 | 4.115 | −4.49 | 4.14 | 0.98 |
| Polychloro phenoxy phenol | Triclosan/ Irgasan | 289.55 | 4.76 | | | |
| Organophosphate Pesticide | Chloropyrifos | 350.59 | 4.96 | | | |
| Carboxylic acid | Flufenamic Acid | 281.23 | 5.2 | | 3.9 | |
| Phenothiazine der. | Chlorpromazine | 318.86 | 5.203 | −5.01 | 9.41 | 3.22 |
| Phenyl imidazole Derivative | Clotrimazole | 344.8 | 6.1 | −5.37 | | |

This invention is further illustrated by the following examples which should not be construed as limiting. The contents of all references, patents and published patent applications cited throughout this application, as well as the Figures, are incorporated herein by reference.

EXAMPLES

Example 1

Generation of a Modified Ultrafiltration Membrane Having Human Skin-Like Permeability Properties In a representative experiment, an ultrafiltration Biomax® 5 PBCC membrane was modified with a mixture of a fatty acid ester and a polydimethylsiloxane to generate a synthetic membrane having human skin-like permeability properties. The Biomax® 5 PBCC membrane was washed with Milli-Q water for 24-48 hours using a roller bottle. The water was replaced 1-2 times during the 24-48 hours with fresh Milli-Q water to ensure cleanliness of the membrane. At the end of washing process, water was discarded and was replaced with methanol (Fisher Scientific, Cat # A454SK-4) and washing was continued for 2-4 hours. At the end of the methanol wash, methanol was discarded and replaced with 1-butanol (Sigma-Aldrich, Cat # 34867). Washing with 1-butanol was continued for 24 hours.

During the time that the membrane was being washed, a mixture of a fatty acid ester, isopropyl myristate (Cat # 172472-1L), and a polydimethylsiloxane, silicone oil (Cat # 378364), both purchased from Sigma Aldrich, was prepared, such that the ratio of the isopropyl myristate and silicon oil was 30:70 (v/v). This mixture is referred to as a "liquid membrane." The liquid membrane, at 35% by volume, was further diluted with 65% by volume of 1-butanol.

The washed ultrafiltration Biomax® 5 PBCC membrane was coated with the liquid membrane diluted with 1-butanol for 2-4 hours. The treated membrane was subsequently dried in a fume hood for about 24 hours, after which the membrane was stored in an airtight container at room temperature until use.

Example 2

Investigating the Diffusion of Caffeine Across the Treated Biomax® 5 PBCC Membrane In a representative experiment, diffusion of caffeine, which is a highly polar compound (Mol. Wt.: 194.2, log P: −0.131), across the treated and untreated ultrafiltration Biomax® 5 PBCC membrane was investigated, as compared to human, rat and pig skin.

Figure 1:
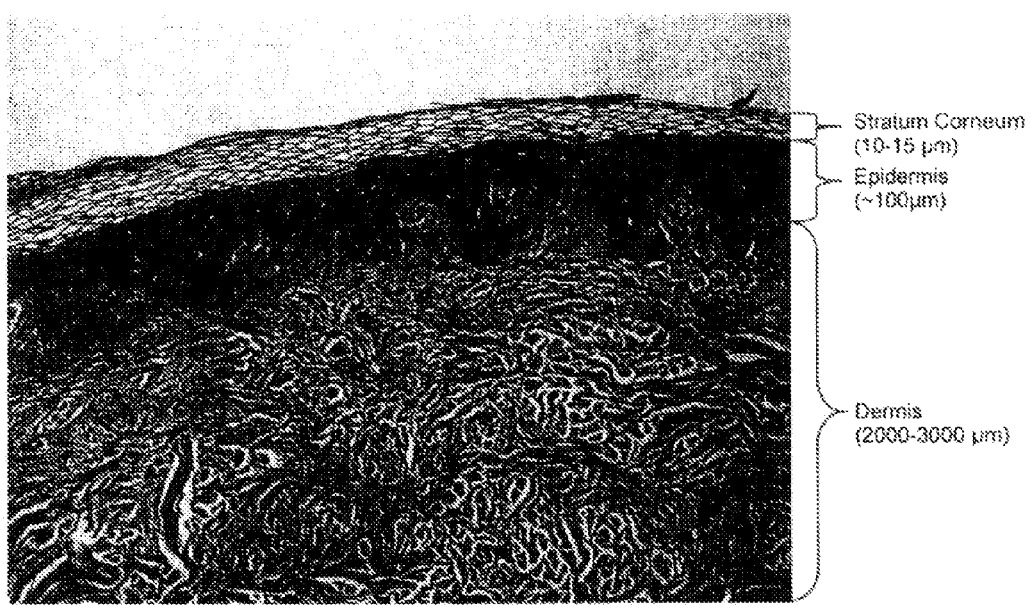
FIG. 1 is a micrograph of a cross-section of human skin, generated using scanning electron microscopy (SEM), depicting different layers of the skin.
Figure 2:
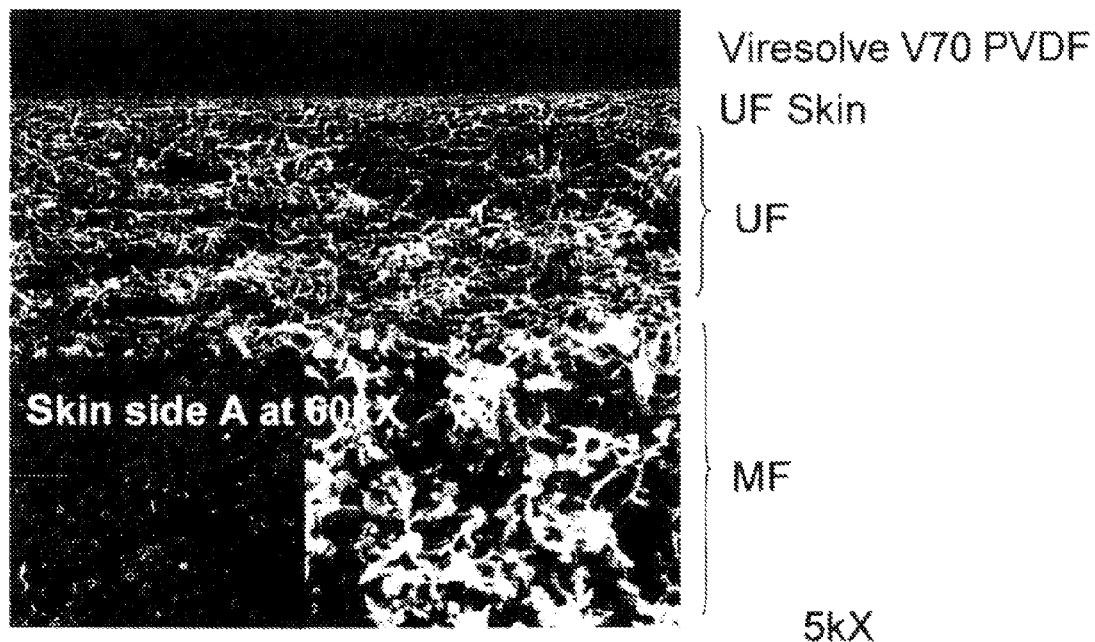
FIG. 2 is a micrograph of a cross-section of the Viresolve V70 (polyvinyledenefluoride) membrane, generated using scanning electron microscopy (SEM).
Figure 3:
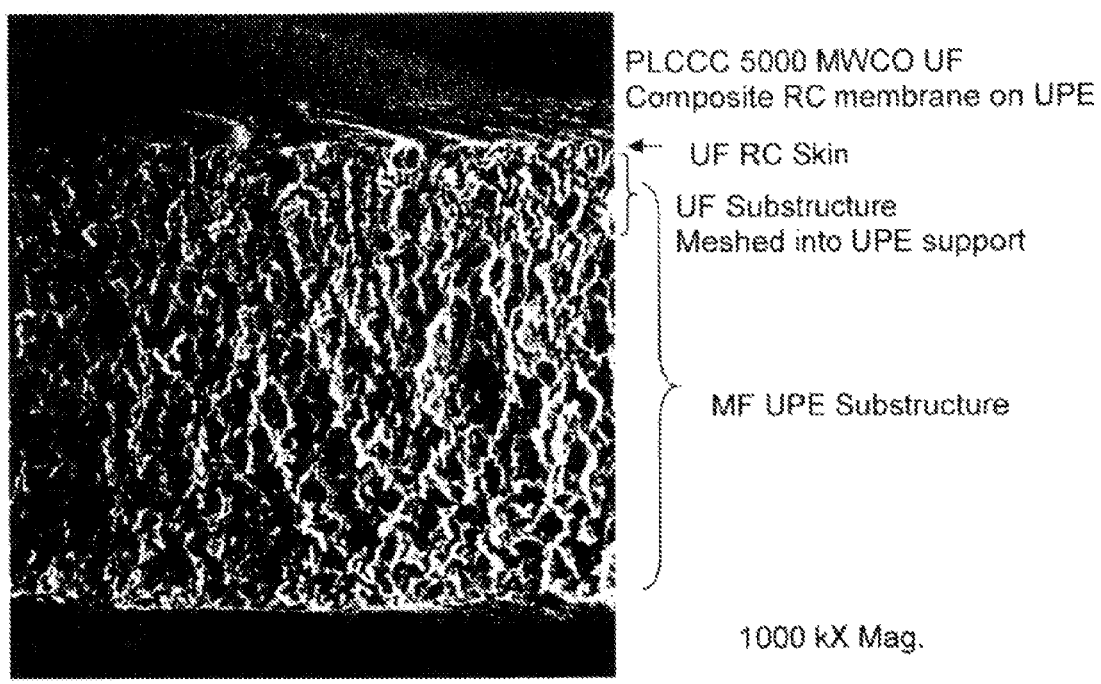
FIG. 3 is a micrograph of a cross-section of PLCCC membrane (a regenerated cellulose based UF membrane), generated using scanning electron microscopy, which shows varying porosities and pore sizes across the thickness of the membrane.
Figure 4:
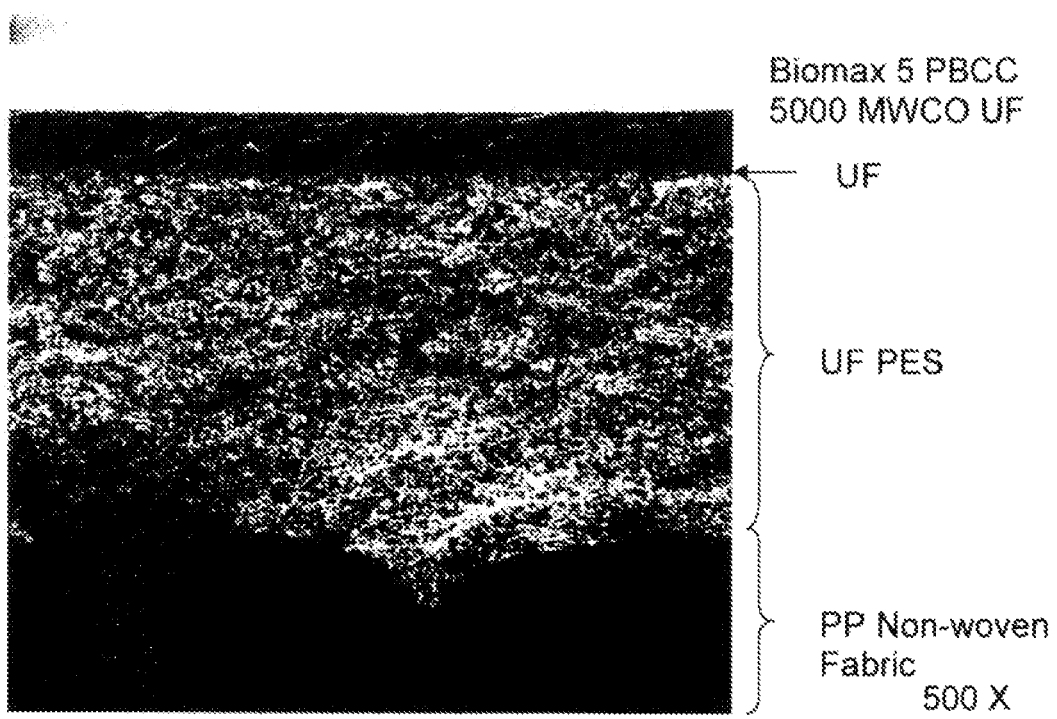
FIG. 4 is a micrograph of cross-section of the Biomax® 5 PBCC membrane, generated using scanning electron microscopy, which shows varying pore morphology and porosity across the thickness of the membrane.
Figure 5:
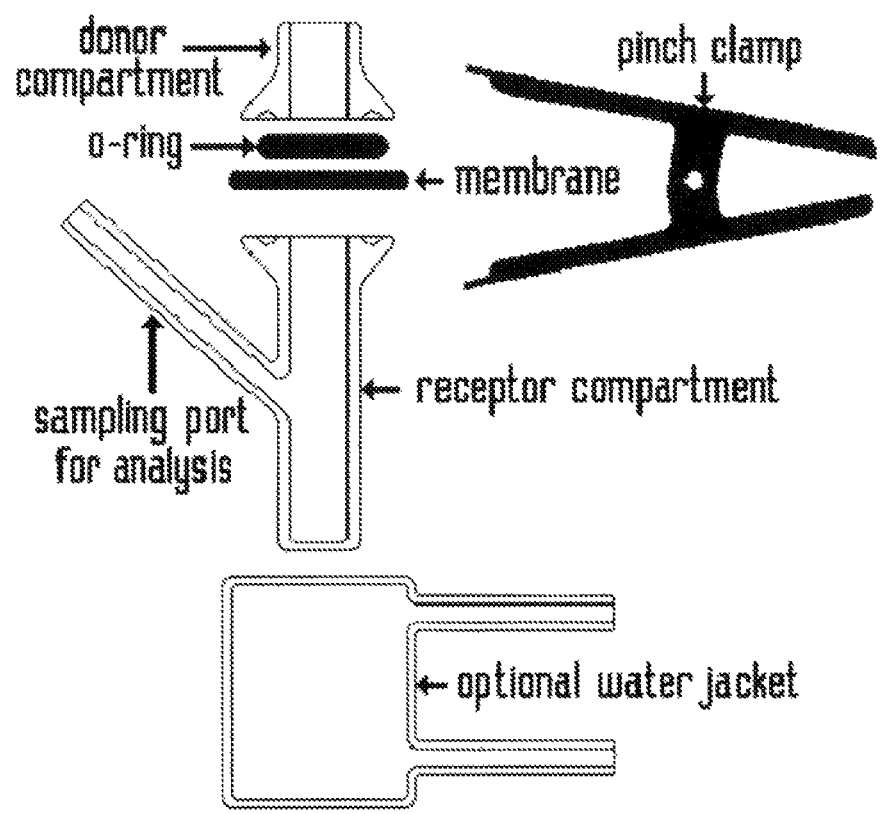
FIG. 5 is a schematic representation of a typical vertical Franz Cell diffusion apparatus used for investigating transdermal diffusion.

The transdermal diffusion experiments were carried out using a vertical Franz Cell assembly similar to one depicted in FIG. 5.

A saturated solution of caffeine (Sigma Aldrich, Cat # C0750) in Milli-Q® water was used as a donor solution and 0.01M phosphate buffered saline (PBS), pH 7.4; solution was used as a receptor solution. It was prepared by dissolving 1 pouch of the buffer salts (Sigma Aldrich, Cat # P3813) in 1000 ml of Milli-Q water. The Franz Cell instrument, FDC-6T Franz Diffusion Cell Drive Console with Tilt (Logan Instruments Corp, Somerset, N.J.) was assembled with the treated Biomax® 5 PBCC membrane positioned with the shiny side facing the donor compartment. The receptor compartment was filled completely with receptor solution. The assembly with water jacket was connected to a water circulating bath capable of controlling the temperature of the water bath within ±0.1° C. Temperature of the bath was set at 37° C. After the temperature stabilized, 500 μl of donor solution was added to the donor compartment. The time was noted and this was recorded as zero time. For sampling, 500 μl of samples were withdrawn from the receptor compartment at following hrs: 0, 1, 2, 3, 4, 5, 6, 8, 10, 24 and 26. After each time point, the receptor compartment was replenished with the receptor solution. Sample analysis was carried out using reversed phase HPLC employing a UV detector. The analysis conditions for HPLC of caffeine were as follows: column used— Zorbax XDB C18, 4.6 mm×150 mm, 5 µm; and mobile phase used: 20% acetonitrile+80% water.

Figure 6:
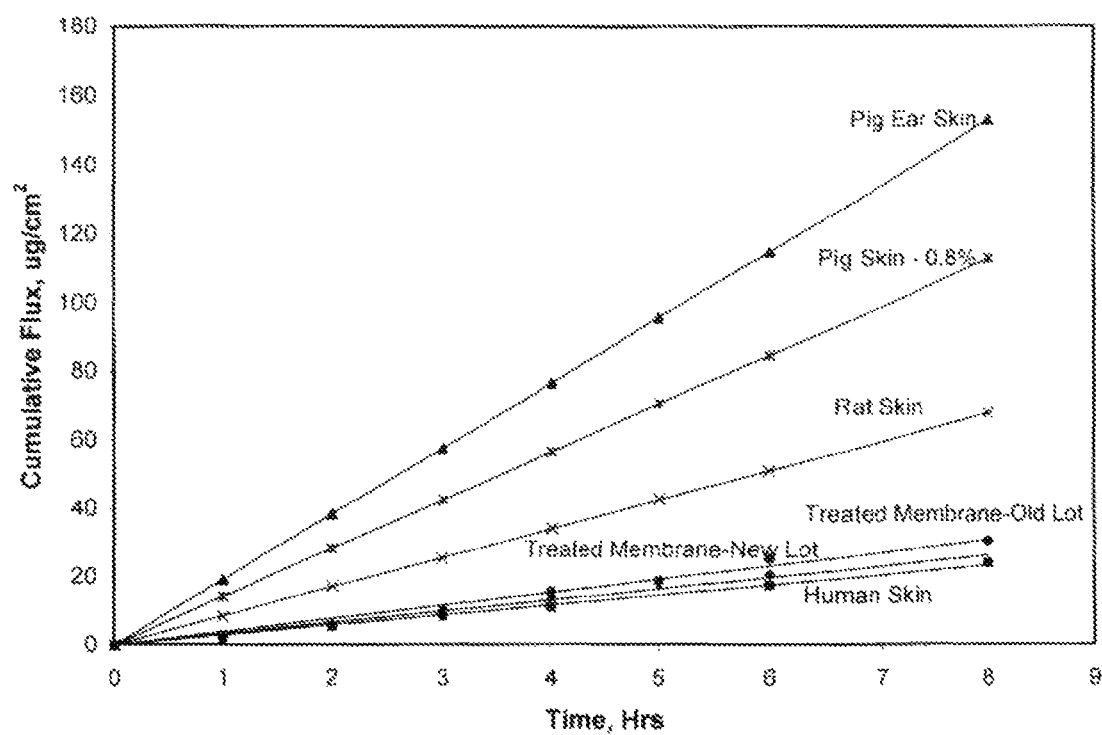
FIG. 6 is a graph summarizing the results of a representative experiment to investigate the cumulative flux of caffeine; a polar compound, through treated Biomax® 5 PBCC membrane relative to human, rat and pig skin. The X-axis denotes time in hours and the Y-axis denotes cumulative flux, as measured in $\mu g/cm^2$. The data demonstrates a high degree of correlation between the membrane and human skin with respect to diffusion of caffeine as well as high reproducibility and low variability between two different lots of the membrane.

The results of a representative experiment are shown in FIG. 6, which demonstrate that the treated membranes, from two different lots, exhibit diffusion similar to human skin for a highly polar compound, caffeine.

Example 3

Investigating the Diffusion of Hydrocortisone Across the Treated Biomax® 5 PBCC Membrane In a representative experiment, diffusion of hydrocortisone, which is a moderately polar compound (Mol. Wt.: 362.4, log P: 1.462), across the treated ultrafiltration Biomax® 5 PBCC membrane was investigated relative to human, rat and pig/minipig skin.

The transdermal diffusion experiments were carried out using a vertical Franz Cell assembly similar to one depicted in FIG. 5.

A saturated solution of hydrocortisone (Sigma Aldrich, Cat #114001) in Milli-Q water was used as a donor solution and 0.01M phosphate buffered saline (PBS), pH 7.4; solution was used as a receptor solution. It was prepared by dissolving 1 pouch of the buffer salts (Sigma Aldrich, Cat. # P3813) in 1.000 mil of Milli-Q water.

The Franz Cell instrument, FDC-6T Franz Diffusion Cell Drive Console with Tilt (Logan Instruments Corp, Somerset, N.J.), was assembled with the treated Biomax® 5 PBCC membrane positioned with the shiny side facing the donor compartment. The receptor compartment was filled completely with receptor solution. The assembly with a water jacket was connected to a water circulating bath capable of controlling the temperature of the water bath within ±0.1° C. Temperature of the bath was set at 37° C. After the temperature stabilized, 500 µl of donor solution was added to the donor compartment. The time was noted and this was recorded as zero time. For sampling, 500 µl of samples were withdrawn from the receptor compartment at following hrs: 0, 1, 2, 3, 4, 5, 6, 8, 10, 24 and 26. After each time point, the receptor compartment was replenished with the receptor solution. Sample analysis was carried out using reversed phase HPLC employing a UV detector.

Conditions for HPLC analysis of hydrocortisone were as follows: column used: Zorbax XDB C18, 3.9 mm×150 mm, 5 µm; mobile phase used: 40% acetonitrile+60% water; and a detection wavelength of 242 nm.

Figure 7:
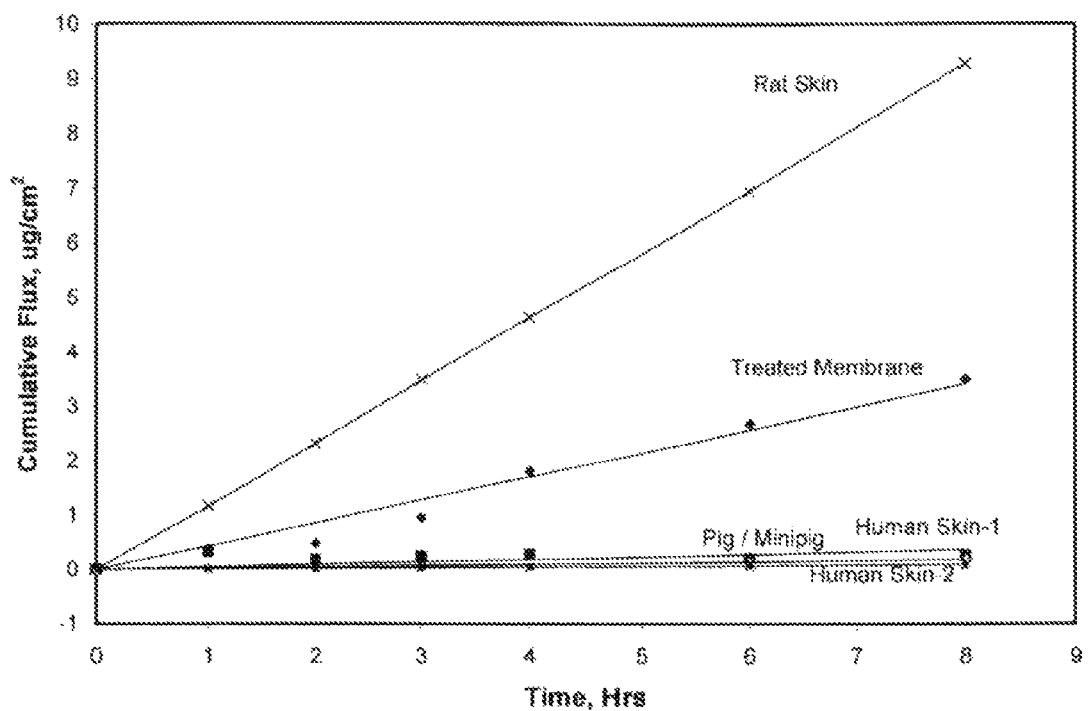
FIG. 7 is a graph summarizing the results of a representative experiment to investigate the cumulative flux of hydrocortisone, a moderately polar compound, through the treated Biomax® 5 PBCC membrane relative to human, rat and pig/mini pig skin. The X-axis denotes time in hours and the Y-axis denotes cumulative flux, as measured in $\mu g/cm^2$. The data demonstrates a high degree of correlation between the membrane and human skin as well as pig/mini pig skin with respect to diffusion of hydrocortisone; however, rat skin, which is the most commonly used models for transdermal diffusion studies, does not appear to show a high degree of correlation with human skin.

The results of a representative experiment are shown in FIG. 7, which demonstrate that the treated membranes according to the claimed invention exhibit diffusion similar to human and pig/minipig skin for hydrocortisone, a moderately polar compound.

Example 4

Investigating the Diffusion of Methyl P-Hydroxy Benzoate Across the Treated and Un-Treated Biomax® 5 PBCC Membrane In another representative experiment, diffusion of methyl p-hydroxy benzoate, which is a moderately polar compound (Mol. Wt.: 152.14, log P: 1.96), across the treated and untreated ultrafiltration Biomax® 5 PBCC membrane was investigated, and compared to three separate human skin samples.

The transdermal diffusion experiments were carried out using a vertical Franz Cell assembly similar to one depicted in FIG. 5.

A saturated solution of methyl p-hydroxybenzoate (Sigma Aldrich, Cat # 547.50) in Milli-Q water was used as a donor solution and 0.01M phosphate buffered saline (PBS), pH 7.4; solution was used as a receptor solution it was prepared by dissolving 1 pouch of the buffer salts (Sigma Aldrich, Cat # P3813) in 1000 ml of Milli-Q water. The Franz Cell instrument, FDC-6T Franz Diffusion Cell Drive Console with Tilt (Logan Instruments Corp, Somerset; NJ) was assembled with either the treated Biomax® 5 PBCC or un-treated membrane positioned with the shiny side facing the donor compartment. The receptor compartment was filled completely with receptor solution. The assembly with water jacket was connected to a water circulating bath capable of controlling the temperature of the water bath within ±0.1° C. Temperature of the bath was set at 37° C. After the temperature stabilized, 500 µl of donor solution was added to the donor compartment. The time was noted and this was recorded as zero time. For sampling, 500 µl of samples were withdrawn from the receptor compartment at following hrs: 0, 1, 2, 3; 4, 5, 6, 8, 10, 24 and 26. After each time point, the receptor compartment was replenished with the receptor solution. Sample analysis was carried out using reversed phase HPLC employing a UV detector.

Conditions for HPLC analysis of methyl p-hydroxybenzoate were as follows: Column Used: Zorbax XDB C18, 3.9 mm×150 mm, 5 µm; Mobile Phase Used: 40% Acetonitrile+60% water.

Figure 8:
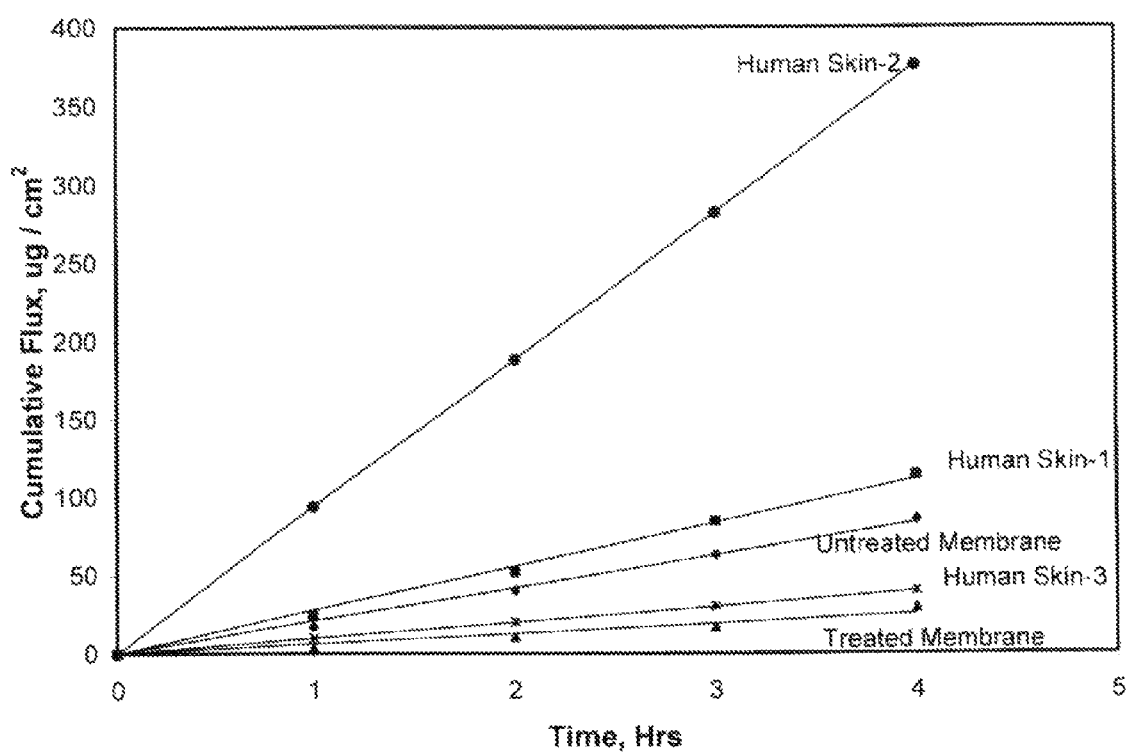
FIG. 8 is a graph summarizing the results of a representative experiment to investigate the cumulative flux of methyl p-hydroxybenzoate, a non-polar compound, through the treated Biomax® 5 PBCC membrane relative to three separate human skin samples. The X-axis denotes time in hours and the Y-axis denotes cumulative flux, as measured in μg/cm². The data demonstrates a high degree of variability between the different human skin samples.

The results of a representative experiment are shown in FIG. 8, which demonstrate a high degree of variability between the different human skin samples, with respect to the diffusion of methyl p-hydroxybenzoate.

Example 5

Investigating the Diffusion of Flufenamic Acid Across the Un-Treated Biomax® 5 PBCC Membrane In yet another experiment, diffusion of flufenamic acid, which is a highly non-polar compound (Mol. Wt.: 281.23, log P: 5.2), across the treated and untreated ultrafiltration Biomax® 5 PBCC membrane was investigated, as compared to human skin.

The transdermal diffusion experiments were carried out using a vertical Franz Cell assembly similar to one depicted in FIG. 5.

A saturated solution of flufenamic acid (Sigma Aldrich, Cat # F9005) in Milli-Q water was used as a donor solution and 0.10 M Sorensen's buffer, pH 7.4, was used as a receptor solution (Fisher Scientific, Cat # 79885). The Franz Cell instrument, FDC-6T Franz Diffusion Cell Drive Console with Tilt (Logan Instruments Corp, Somerset, N.J.) was assembled with either the treated Biomax® 5 PBCC or un-treated membrane positioned with the shiny side facing the donor compartment. The receptor compartment was filled completely with receptor solution. The assembly with water jacket was connected to a water circulating bath capable of controlling the temperature of the water bath within ±0.1° C. Temperature of the bath was set at 37° C. After the temperature stabilized, 500 µl of donor solution was added to the donor compartment. The time was noted and this was recorded as zero time. For sampling, 500 µl of samples were withdrawn from the receptor compartment at following hrs: 0, 1, 2, 3, 4, 5, 6, 8, 10, 24 and 26. After each time point, the receptor compartment was replenished with the receptor solution. Sample analysis was carried out using reversed phase HPLC employing a UV detector.

Conditions for HPLC analysis of flufenamic acid are as noted below: Column Used: Zorbax XDB C18, 3.9 mm×150 mm, 5 µm Mobile Phase Used: 90% Methanol+10% water containing 40 mM acetic acid; Detection wavelength: 280 nm.

Figure 9:
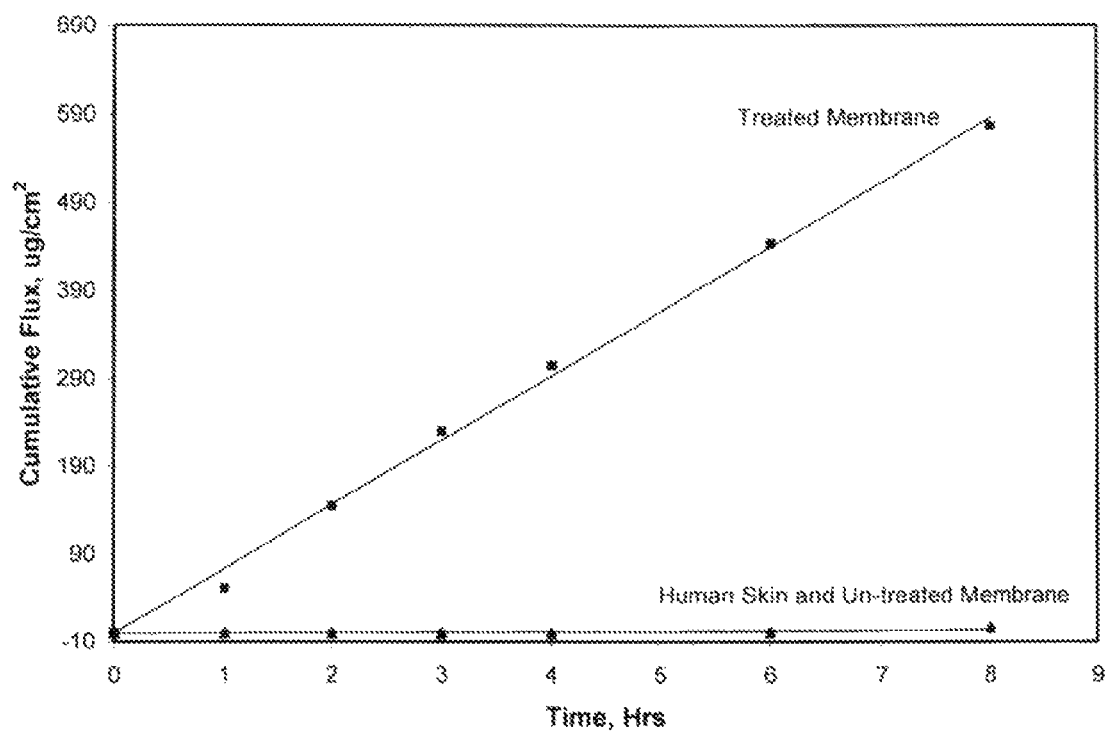
FIG. 9 is a graph summarizing the results of a representative experiment to investigate the cumulative flux of flufenamic acid, a non-polar compound, through treated as well as un-treated Biomax®5 PBCC membrane, relative to human skin. The X-axis denotes time in hours and the Y-axis denotes cumulative flux, as measured in μg/cm². The data demonstrates a high degree of correlation between the untreated membrane and human skin, with respect to the diffusion of flufenamic acid.

The results of a representative experiment are shown in FIG. 9, which demonstrate that for flufenamic acid, a non-polar compound, the untreated membrane appears to have a better correlation to human skin than the treated membrane.

Example 6

Investigating the Diffusion of Clotrimazole Across the Treated Biomax® 5 PBCC Membrane In another experiment, diffusion of clotrimazole, which is a highly non-polar compound (Mol. Wt.: 344.8, log P: 6.1), across the treated and untreated ultrafiltration Biomax® 5. PBCC membrane was investigated, as compared to human and rat skin.

The transdermal diffusion experiments were carried out using a vertical Franz Cell assembly similar to one depicted in FIG. 5.

A saturated solution of clotrimazole (Sigma Aldrich, Cat # C6019) in Milli-Q water was used as a donor solution and 0.01M phosphate buffered saline (PBS), pH 7.4; solution was used as a receptor solution. It was prepared by dissolving 1 pouch of the buffer salts (Sigma Aldrich, Cat # P3813) in 1000 ml of Milli-Q water. The Franz Cell instrument, FDC-6T Franz Diffusion Cell Drive Console with Tilt (Logan Instruments Corp, Somerset, N.J.) was assembled with either the treated or untreated Biomax® 5 PBCC membrane positioned with the shiny side facing the donor compartment. The receptor compartment was filled completely with receptor solution. The assembly with water jacket was connected to a water circulating bath capable of controlling the temperature of the water bath within ±0.1° C. Temperature of the bath was set at 37° C. After the temperature stabilized, 500 µl of donor solution was added to the donor compartment. The time was noted and this was recorded as zero time. For sampling, 500 µl of samples were withdrawn from the receptor compartment at following hrs: 0, 1, 2, 3, 4, 5, 6, 8, 10, 24 and 26. After each time point, the receptor compartment was replenished with the receptor solution. Sample analysis was carried out using reversed phase HPLC employing a UV detector.

Conditions for HPLC analysis of clotrimazole were as follows: column used: µBondapak C 8, 4.6 mm×300 mm, 10 µm; mobile phase used: 65% Methanol containing 0.1% Trifluoroacetic acid+35% water containing 0.1% Trifluoroacetic acid; and detection wavelength: 260 nm.

Figure 10:
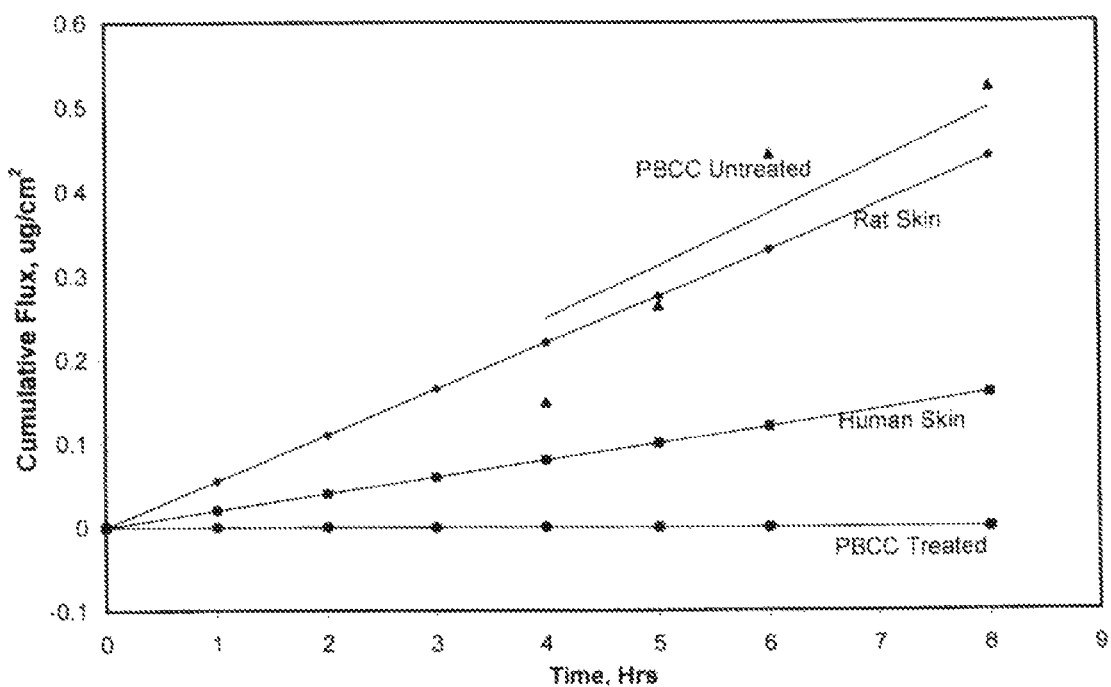
FIG. 10 is a graph summarizing the results of a representative experiment to investigate the cumulative flux of clotrimazole, a non-polar compound, through the treated Biomax® 5 PBCC membrane relative to human and rat skin. The X-axis denotes time in hours and the Y-axis denotes cumulative flux, as measured in μg/cm². The data demonstrates a high degree of correlation between the treated membrane and human skin, with respect to the diffusion of clotrimazole.

The results of a representative experiment are shown in FIG. 10, which demonstrate that the treated membranes exhibit a high degree of correlation with human skin for clotrimazle, a non-polar compound.

Example 7

Investigating the Diffusion of Dexamethasone Across the Treated Biomax® 5 PBCC Membrane In another experiment, diffusion of dexamethasone, which is a moderately polar compound (Mol. Wt.: 392.5, log P: 1.896), across the treated and untreated ultrafiltration Biomax® 5 PBCC membrane was investigated, as compared to human, pig and rat skin.

The transdermal diffusion experiments were carried out using a vertical Franz Cell assembly similar to one depicted in FIG. 5.

A saturated solution of dexamethasone (Sigma Aldrich, Cat # D1756) in Milli-Q water was used as a donor solution and 0.01M phosphate buffered saline (PBS), pH 7.4; solution was used as a receptor solution. It was prepared by dissolving 1 pouch of the buffer salts (Sigma Aldrich, Cat # P3813) in 1000 ml of Milli-Q water. The Franz Cell instrument, FDC-6T Franz Diffusion Cell Drive Console with Tilt (Logan Instruments Corp, Somerset, N.J.) was assembled with the treated Biomax® 5 PBCC membrane positioned with the shiny side facing the donor compartment. The receptor compartment was filled completely with receptor solution. The assembly with water jacket was connected to: a water circulating bath capable of controlling the temperature of the water bath within ±0.1° C. Temperature of the bath was set at 37° C. After the temperature stabilized, 500 µl of donor solution was added to the donor compartment. The time was noted and this was recorded as zero time. For sampling, 500 µl of samples were withdrawn from the receptor compartment at following hrs: 0, 1, 2, 3, 4, 5, 6, 8, 10, 24 and 26. After each time point, the receptor compartment was replenished with the receptor solution. Sample analysis was carried out using reversed phase HPLC employing a UV detector.

Conditions for HPLC analysis of dexamethasone were as follows: column used: Zorbax XDB C18, 4.6 mm×150 mm, 5 µm; mobile phase used: Acetonitrile+Water and detection wavelength: 240 nm.

Figure 11:
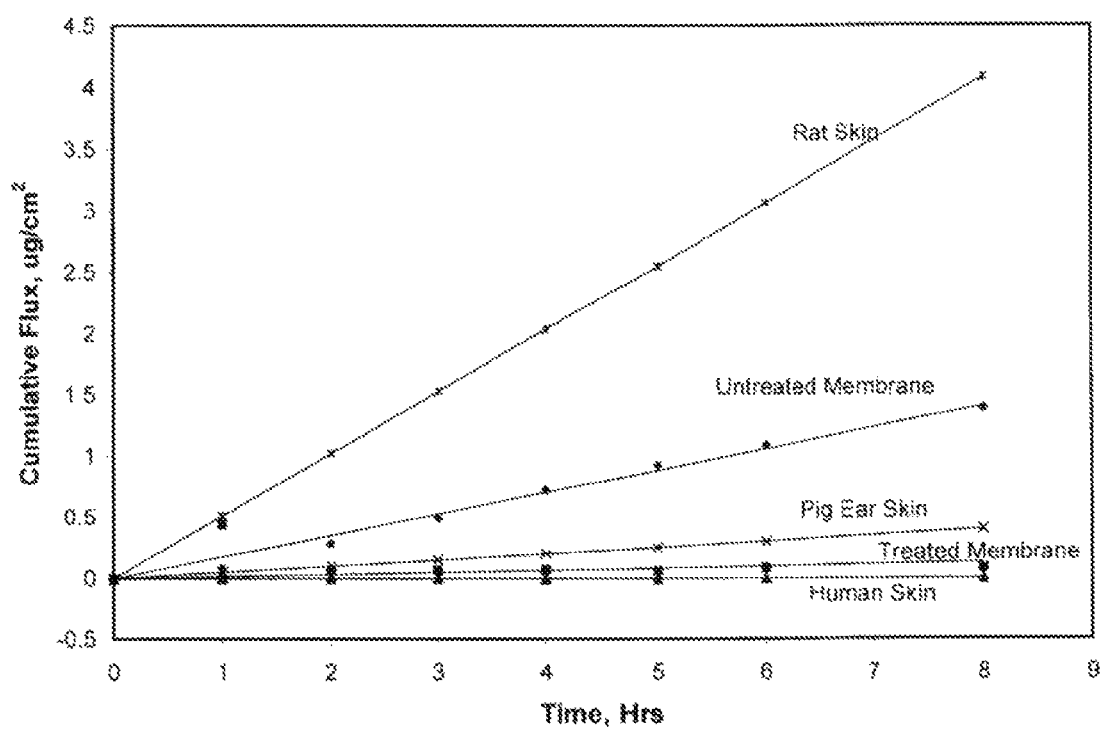
FIG. 11 is a graph summarizing the results of a representative experiment to investigate the cumulative flux of dexamethasone, a moderately polar compound, through the treated Biomax® 5 PBCC membrane relative to human, rat and pig skin. The X-axis denotes time in hours and the Y-axis denotes cumulative flux, as measured in μg/cm². The data demonstrates a high degree of correlation between the treated membrane and human and pig skin, with respect to the diffusion of dexamethasone.

The results of a representative experiment are shown in FIG. 11 which demonstrate that the membranes according to the claimed invention exhibit diffusion similar to human and pig skin for dexamethasone, a moderately polar compound.

Example 8

Investigating the Diffusion of Flurbiprofen Across the Treated Biomax® 5 PBCC Membrane In another experiment, diffusion of Flurbiprofen, which is a non-polar compound (Mol. Wt.: 244, log P: 4.115), across the treated and untreated ultrafiltration Biomax® 5 PBCC membrane was investigated, as compared to three separate rat skin samples of different ages.

The transdermal diffusion experiments were carried out using a vertical Franz Cell assembly similar to one depicted in FIG. 5.

A saturated solution of flurbiprofen (Sigma Aldrich, Cat # F8514) in Milli-Q water was used as a donor solution and 0.01M phosphate buffered saline (PBS), pH 7.4; solution was used as a receptor solution. It was prepared by dissolving 1 pouch of the buffer salts (Sigma Aldrich, Cat # P3813) in 1000 ml of Milli-Q water. The Franz Cell instrument, FDC-6T Franz Diffusion Cell Drive Console with Tilt (Logan Instruments Corp, Somerset, N.J.) was assembled with the treated Biomax® 5 PBCC membrane positioned with the shiny side facing the donor compartment. The receptor compartment was filled completely with receptor solution. The assembly with water jacket was connected to a water circulating bath capable of controlling the temperature of the water bath within ±0.1° C. Temperature of the bath was set at 37° C. After the temperature stabilized, 500 µl of donor solution was added to the donor compartment. The time was noted and this was recorded as zero time. For sampling, 500 µl of samples were withdrawn from the receptor compartment at following hrs: 0, 1, 2, 3, 4, 5, 6, 8, 10, 24 and 26. After each time point, the receptor compartment was replenished with the receptor solution. Sample analysis was carried out using reversed phase HPLC employing a UV detector.

Conditions for HPLC analysis of flurbiprofen were as follows: column used: μ Bondapak C1.8, 4.6 mm×300 mm, 10 μm; mobile phase used: 70% Methanol+30% Water containing 0.1% Formic acid and detection wavelength: 260 nm.

Figure 12:
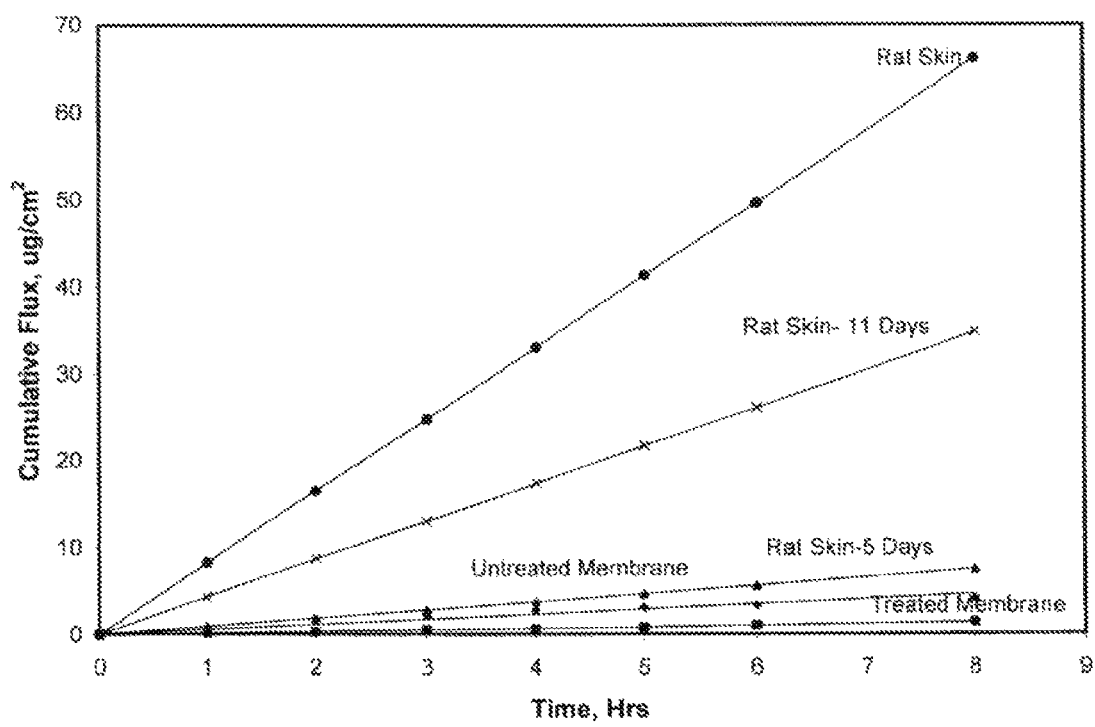
FIG. 12 is a graph summarizing the results of a representative experiment to investigate the cumulative flux of flurbiprofen, a non-polar compound, through the treated Biomax® 5 PBCC membrane relative to rat skin samples of various ages. The X-axis denotes time in hours and the Y-axis denotes cumulative flux, as measured in μg/cm². The data demonstrates a high degree of variability between the different rat skin samples, with respect to the diffusion of flurbiprofen.

The results of a representative experiment are shown in FIG. 12, which demonstrate a high degree of variability between the rat skin samples of different ages, with respect to the diffusion of flurbiprofen.

Example 9

Investigating the Diffusion of Nicotine Across the Treated and Untreated Biomax® 5 PBCC Membrane In another experiment, diffusion of Nicotine, which is a polar compound (Mol. Wt.: 162.23, log P: 0.72), across the treated and untreated ultrafiltration Biomax® 5 PBCC membrane was investigated, as compared to human and rat skin.

The transdermal diffusion experiments were carried out using a vertical Franz Cell assembly similar to one depicted in FIG. 5.

A saturated solution of nicotine (Sigma Aldrich, Cat # N0267) in Milli-Q water was used as a donor solution and 0.01M phosphate buffered saline (PBS), pH 7.4; solution was used as a receptor solution. It was prepared by dissolving 1 pouch of the buffer salts (Sigma Aldrich, Cat # P3813) in 1000 ml of Milli-Q water. The Franz Cell instrument, FDC-6T Franz Diffusion Cell Drive Console with Tilt (Logan Instruments Corp, Somerset, N.J.) was assembled with the treated and un-treated Biomax® 5 PBCC membrane positioned with the shiny side facing the donor compartment. The receptor compartment was filled completely with receptor solution. The assembly with water jacket was connected to a water circulating bath capable of controlling the temperature of the water bath within ±0.1° C. Temperature of the bath was set at 37° C. After the temperature stabilized, 500 μl of donor solution was added to the donor compartment. The time was noted and this was recorded as zero time. For sampling, 500 μl of samples were withdrawn from the receptor compartment at following hrs: 0, 1, 2, 3, 4, 5, 6, 8, 10, 24 and 26. After each time point, the receptor compartment was replenished with the receptor solution. Sample analysis was carried out using reversed phase HPLC employing a UV detector.

Conditions for HPLC analysis of nicotine were as follows: column used: Zorbax XDB C18, 4.6 mm×150 mm, 5 μm; mobile phase used: 2% Acetonitrile+98% Water containing 0.1% Formic acid and detection wavelength: 260 nm.

Figure 13:
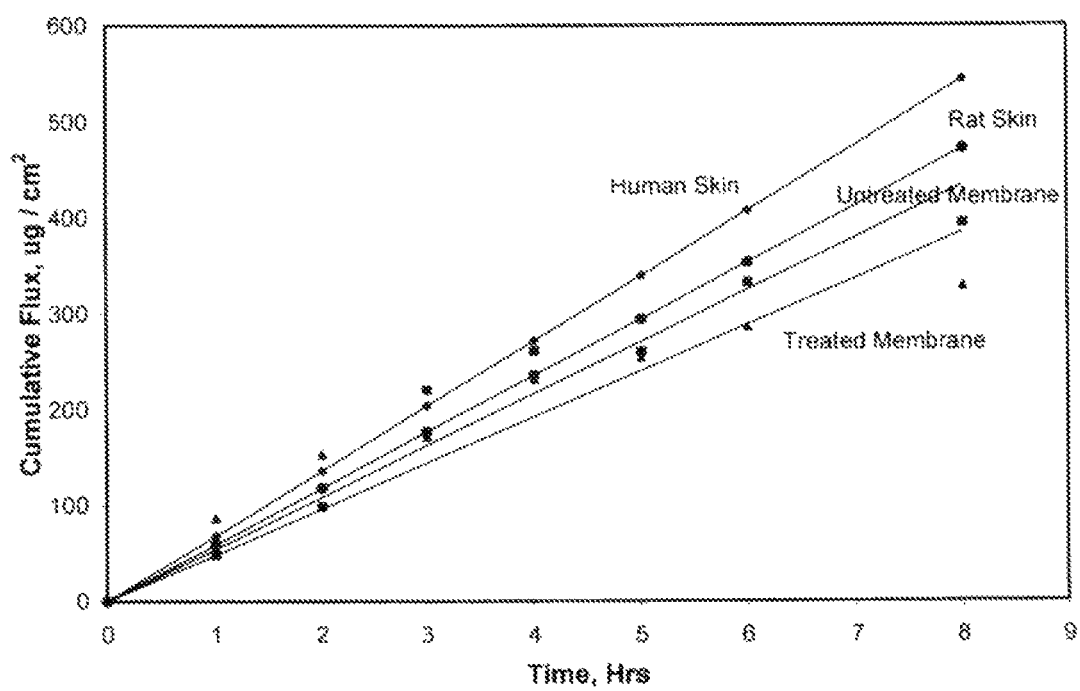
FIG. 13 is a graph summarizing the results of a representative experiment to investigate the cumulative flux of nicotine, a polar compound, through the treated and untreated Biomax® 5 PBCC membrane relative to human and rat skin. The X-axis denotes time in hours and the Y-axis denotes cumulative flux, as measured in μg/cm². The data appears to suggest variability between rat and human skin, with respect to the diffusion of nicotine.

The results of a representative experiment are shown in FIG. 13, which shows variability between the rat and human skin samples, with respect to the diffusion of nicotine, a polar compound.

Example 10

Investigating the Diffusion of Diclofenac Na Across the Treated Biomax® 5 PBCC Membrane In another experiment, diffusion of Diclofenac Na, which is a non-polar compound (Mol. Wt.: 318.13, log P: 4.05), across the treated ultrafiltration Biomax® 5 PBCC membrane was investigated; relative to two separate human skin samples.

The transdermal diffusion experiments were carried out using a vertical Franz Cell assembly similar to one depicted in FIG. 5.

A saturated solution of Diclofenac Na (Sigma Aldrich, Cat # D6899) in Milli-Q water was used as a donor solution and 0.01M phosphate buffered saline (PBS), pH 7.4; solution was used as a receptor solution. It was prepared by dissolving 1 pouch of the buffer salts (Sigma Aldrich, Cat # P3813) in 1000 ml of Milli-Q water. The Franz Cell instrument, FDC-6T Franz Diffusion Cell Drive Console with Tilt (Logan Instruments Corp, Somerset, N.J.) was assembled with the treated and un-treated Biomax® 5 PBCC membrane positioned with the shiny side facing the donor compartment. The receptor compartment was filled completely with receptor solution. The assembly with water jacket was connected to a water circulating bath capable of controlling the temperature of the water bath within ±0.1° C. Temperature of the bath was set at 37° C. After the temperature stabilized, 500 μl of donor solution was added to the donor compartment. The time was noted and this was recorded as zero time. For sampling, 500 μl of samples were withdrawn from the receptor compartment at following hrs: 0, 1, 2, 3, 4, 5, 6, 8, 10, 24 and 26. After each time point, the receptor compartment was replenished with the receptor solution. Sample analysis was carried out using reversed phase HPLC employing a UV detector.

Conditions for HPLC analysis of diclofenac Na were as follows: column used: Zorbax XDB C18, 3.9 mm×150 mm, 5 μm; mobile phase used: 80% Methanol+20% Water containing 0.1% Trifluoro acetic acid and detection wavelength: 280 nm.

Figure 14:
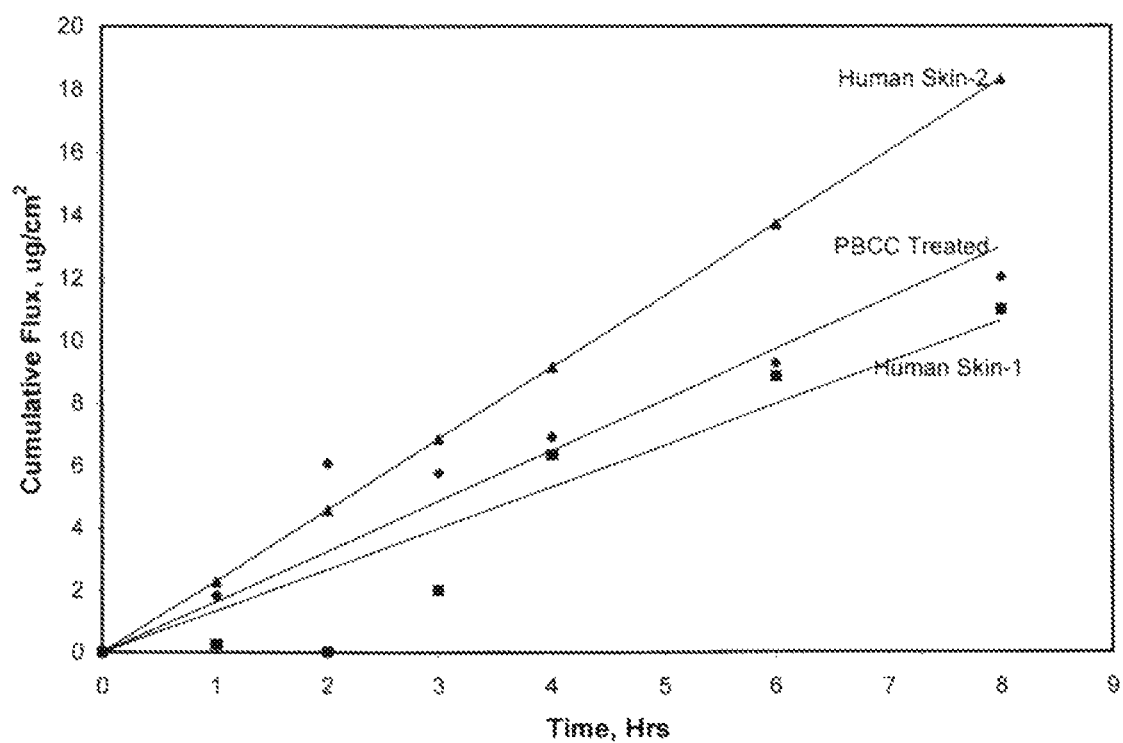
FIG. 14 is a graph summarizing the results of a representative experiment to investigate the cumulative flux of Diclofenac Na, a non-polar compound, through the treated Biomax® 5 PBCC membrane relative to human skin. The X-axis denotes time in hours and the Y-axis denotes cumulative flux, as measured in μg/cm². The data demonstrates variability between the different skin samples, with respect to the diffusion of Diclofenac Na.
Figure 15:
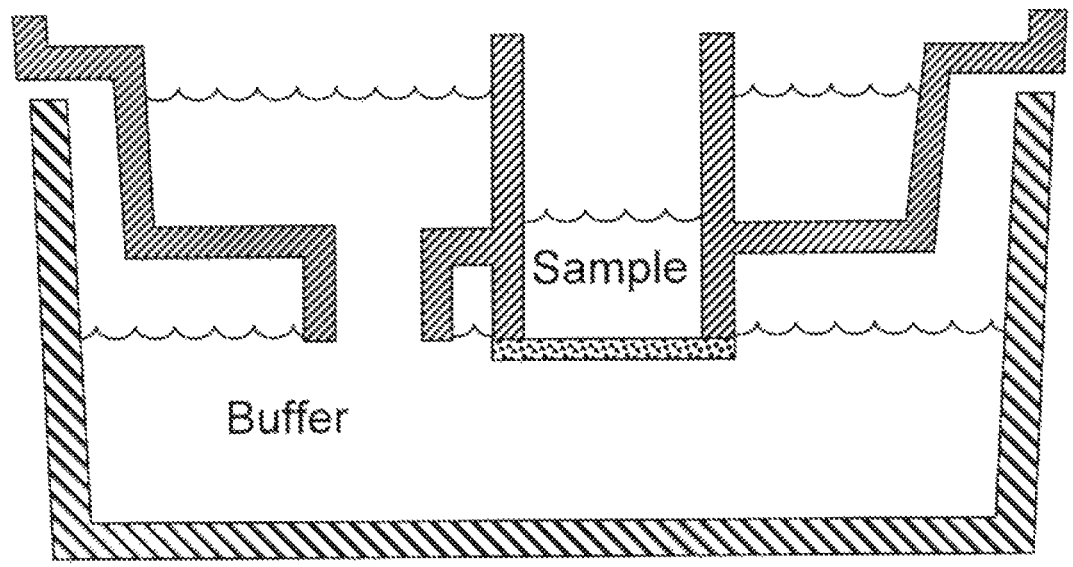
FIG. 15 is a schematic of a cross-section of a device (e.g., a multiwell plate) which contains a synthetic membrane according to the invention, which may be in a disposable format and useful for high throughput screening.
Figure 16:
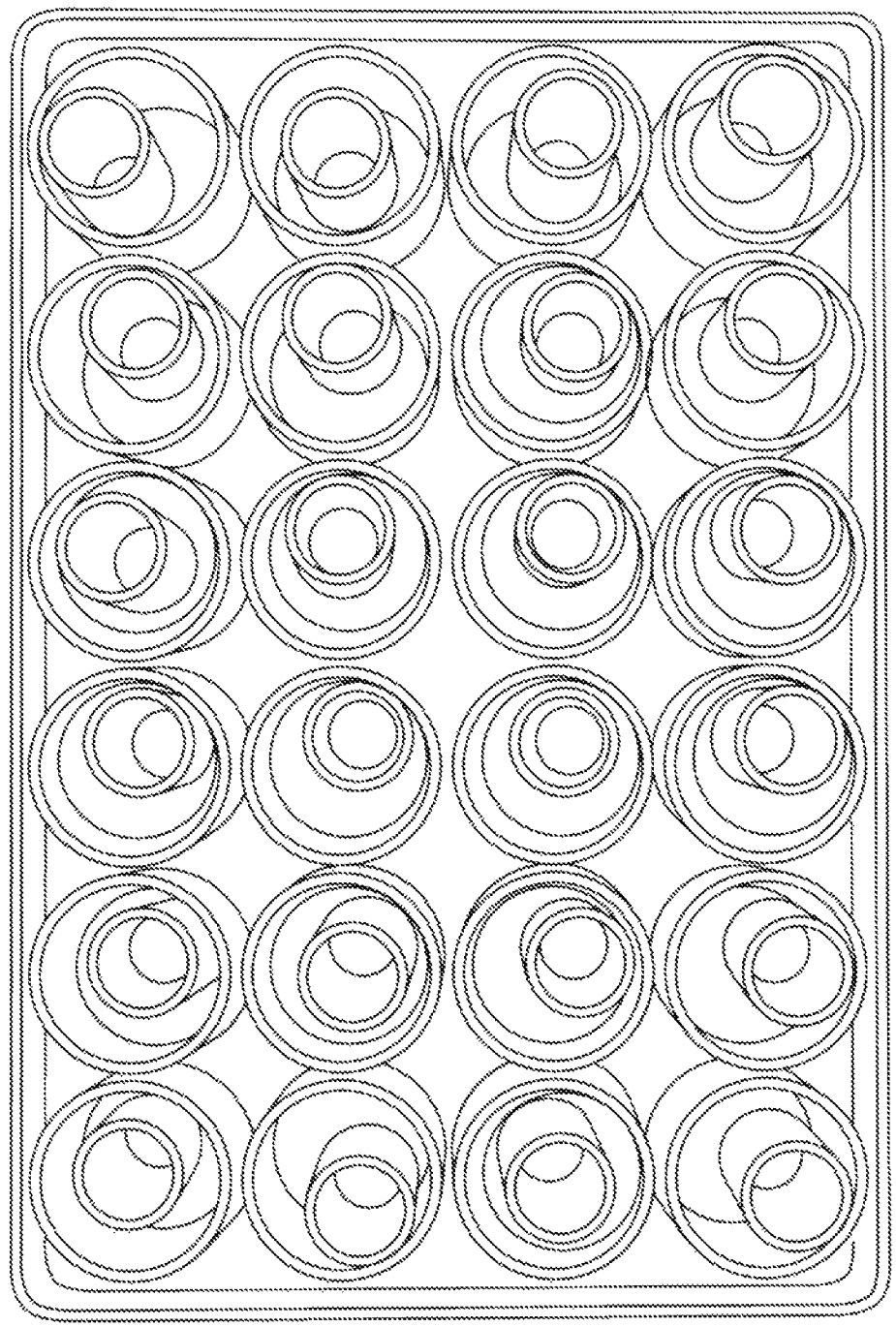
FIG. 16 is a photograph of a representative multiwell plate device containing a synthetic membrane according to the invention, which may be used for high throughput screening of compounds and, formulations.
Figure 17:
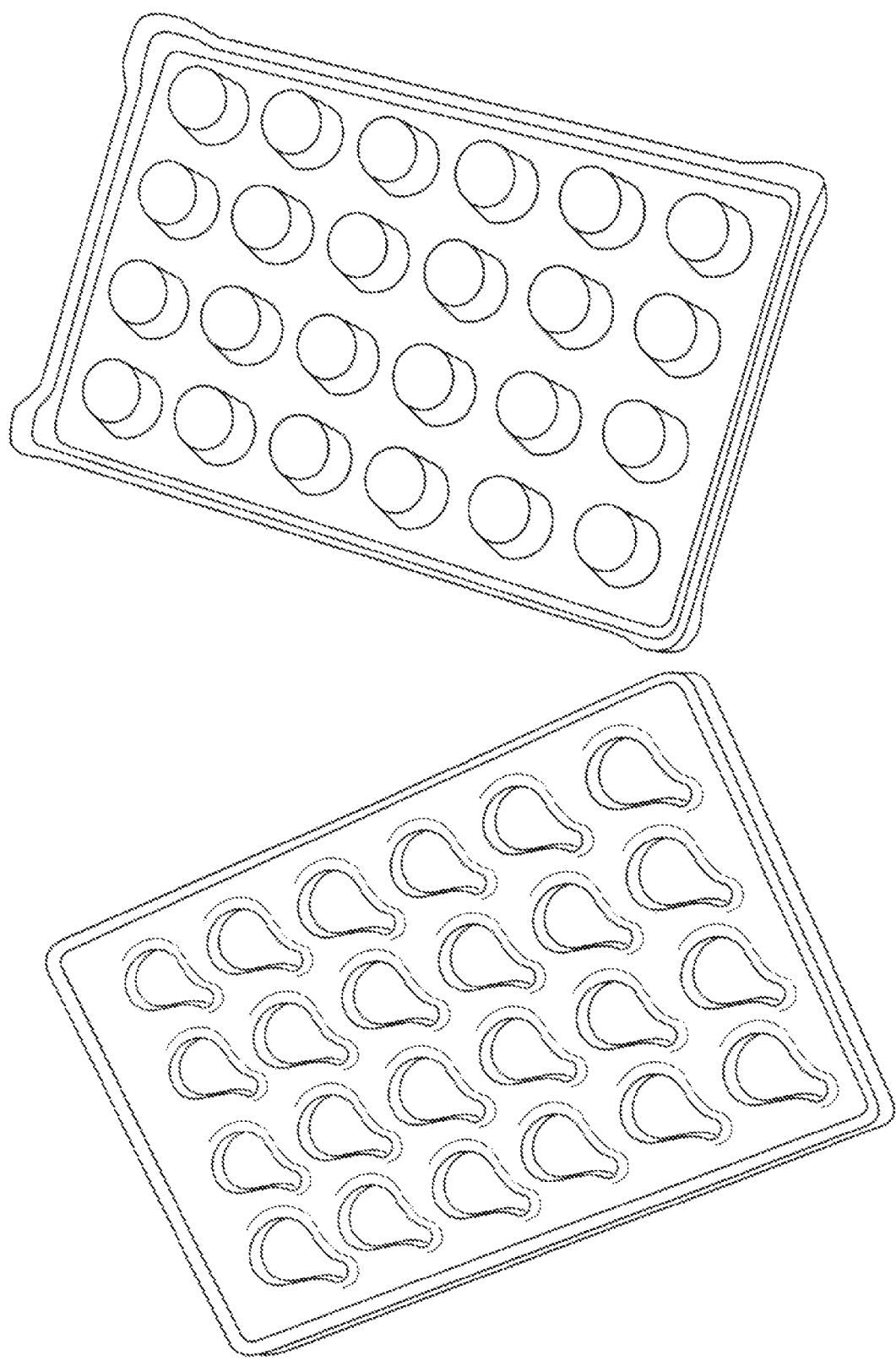
FIG. 17 is another photograph of a representative multiwell plate device containing a synthetic membrane according to the invention along with the receiver plate, which may be used for high throughput screening of compounds and formulations.

The results of a representative experiment are shown in FIG. 14, which demonstrate a high degree of variability between the different human skin samples, with respect to the diffusion of diclofenac Na.

The specification is most thoroughly understood in light of the teachings of the references cited within the specification which are hereby incorporated by reference. The embodiments within the specification provide an illustration of embodiments in this invention and should not be construed to limit its scope. The skilled artisan readily recognizes that many other embodiments are encompassed by this invention. All publications and inventions are incorporated by reference in their entirety. To the extent that the material incorporated by reference contradicts or is inconsistent with the present specification, the present specification will supercede any such material. The citation of any references herein is not an admission that such references are prior art to the present invention.

Unless otherwise indicated, all numbers expressing quantities of ingredients, cell culture, treatment conditions, and so forth used in the specification, including claims, are to be understood as being modified in all instances by the term "about." Accordingly, unless otherwise indicated to the contrary, the numerical parameters are approximations and may vary depending upon the desired properties sought to be obtained by the present invention. Unless otherwise indicated, the term "at least" preceding a series of elements is to be understood to refer to every element in the series. Those skilled in the art will recognize, or be able to ascertain using no more than routine experimentation, many equivalents to the specific embodiments of the invention described herein. Such equivalents are intended to be encompassed by the following claims.

Many modifications and variations of this invention can be made without departing from its spirit and scope, as will be apparent to those skilled in the art. The specific embodiments described herein are offered by way of example only and are not meant to be limiting in any way. It is intended that the specification and examples be considered as exemplary only, with a true scope and spirit of the invention being indicated by the following claims.

What is claimed is:

1. A modified ultrafiltration membrane, wherein the modification comprises treatment of the membrane with a mixture of a fatty acid ester and a polydimethylsiloxane, wherein the modified ultrafiltration membrane comprises human skin-like permeability properties and a pore size of 0.1 microns or smaller than 0.1 microns.

2. The membrane of claim 1, wherein the fatty acid ester is isopropyl myristate and the polydimethylsiloxane is silicone oil.

3. The ultrafiltration membrane of claim 1, wherein the membrane is a polyethersulfone membrane.

4. A device containing the membrane according to claim 1.

5. The modified ultratiltration membrane of claim 1, wherein human skin-like permeability properties comprise a high degree of correlation with human skin for the diffusion of one or more compounds.

6. The device of claim 5, wherein the device is as multiwell screening plate comprising as plurality of wells, each well comprising the membrane.

7. A modified ultrafiltration membrane, wherein the modification comprises treatment of the membrane with a mixture of isopropyl myristate and silicone oil, wherein the modified ultrafiltration membrane comprises human skin-like permeability properties and a pore size of 1.0 microns or smaller than 1.0 microns.

8. The uttrafiltration membrane of claim 7, wherein the membrane is a polyethersulfone membrane.

9. The modified ultrafiltration membrane of claim 7, wherein human skin-like permeability properties comprise a high degree of correlation with human skin for the diffusion of one or more compounds.

10. A device containing the membrane according to claim 7.

11. A modified polyethersuifone membrane, wherein the modification comprises treatment of the membrane with a mixture of a fatty acid ester and a polydimethylsiloxane, wherein the modified polyethersulfone membrane comprises human skin-like permeability properties.

12. A method of making a synthetic membrane which comprises human skin-like permeability properties, the method comprising the steps of: (a) providing a polyethersulfone ultrafiltration membrane; and (b) coating the membrane with a mixture of as fatty acid ester and a polydimethylsiloxane, thereby resulting in a synthetic membrane which comprises human skin-like permeability properties.

13. The method of claim 12, wherein the fatty acid ester is isopropyl myristate and the polydimethylsiloxane is silicone oil.

14. The method of claim 12, wherein the synthetic membrane exhibits diffusion similar to human skin it compounds having different physico-chemical properties.

* * * * *

UNITED STATES PATENT AND TRADEMARK OFFICE
CERTIFICATE OF CORRECTION

PATENT NO. : 8,765,254 B2
APPLICATION NO. : 13/079511
DATED : July 1, 2014
INVENTOR(S) : Elena Chernokalskaya et al.

It is certified that error appears in the above-identified patent and that said Letters Patent is hereby corrected as shown below:

In the Claims

In column 15, line 24, in claim 6, delete "claim 5," and insert -- claim 4 --, therefor.

In column 15, line 24, in claim 6, delete "as" and insert -- a --, therefor.

In column 15, line 25, in claim 6, delete "as" and insert -- a --, therefor.

In column 16, line 2, in claim 7, delete "1.0" and insert -- 0.1 --, therefor.

In column 16, line 3, in claim 7, delete "1.0 microms" and insert -- 0.1 microns --, therefor.

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,765,254 B2 |
| APPLICATION NO. | : 13/079511 |
| DATED | : July 1, 2014 |
| INVENTOR(S) | : Elena Chernokalskaya et al. |

It is certified that error appears in the above-identified patent and that said Letters Patent is hereby corrected as shown below:

In the Claims

In column 16, line 12, in claim 11, delete "polyethersuifone" and insert -- polyethersulfone --, therefor Signed and Sealed this
Twenty-fourth Day of February, 2015

Michelle K. Lee
*Deputy Director of the United States Patent and Trademark Office*